US012718417B2

(12) United States Patent
Li et al.

(10) Patent No.: US 12,718,417 B2
(45) Date of Patent: Aug. 25, 2026

(54) METHOD, DEVICE AND STORAGE MEDIUM FOR EFFICIENTLY COMPRESSING A DYNAMIC 3D MODEL SEQUENCE BASED ON 4D FUSION

(71) Applicant: Sony Group Corporation, Tokyo (JP)

(72) Inventors: Xiang Li, Beijing (CN); Hong Shang, Beijing (CN); Zhan Shi, Beijing (CN); Kuanhong Xu, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 256 days.

(21) Appl. No.: 18/688,361

(22) PCT Filed: Sep. 5, 2022

(86) PCT No.: PCT/CN2022/116952
§ 371 (c)(1),
(2) Date: Mar. 1, 2024

(87) PCT Pub. No.: WO2023/036069
PCT Pub. Date: Mar. 16, 2023

(65) Prior Publication Data

US 2025/0124603 A1 Apr. 17, 2025

(30) Foreign Application Priority Data

Sep. 9, 2021 (CN) ......................... 202111052737.4

(51) Int. Cl.
*G06T 9/00* (2006.01)
*G06T 19/20* (2011.01)

(52) U.S. Cl.
CPC .............. *G06T 9/001* (2013.01); *G06T 19/20* (2013.01); *G06T 2210/56* (2013.01);
(Continued)

(58) Field of Classification Search
CPC ..... G06T 9/001; G06T 19/20; G06T 2210/56; G06T 2219/2004; G06T 2219/2016; G06T 2219/2021
See application file for complete search history.

(56) References Cited

U.S. PATENT DOCUMENTS

2014/0362091 A1* 12/2014 Bouaziz .................. G06T 7/292
345/473
2015/0009214 A1 1/2015 Lee et al.

FOREIGN PATENT DOCUMENTS

CN 108053437 A 5/2018
CN 108921926 A 11/2018
CN 110874864 A 3/2020

OTHER PUBLICATIONS

Cagniart et al., "Iterative Mesh Deformation for Dense Surface Tracking", 2009 IEEE 12th International Conference on Computer Vision Workshops, ICCV Workshops, Sep. 27, 2009-Oct. 4, 2009, 8 pages.

(Continued)

*Primary Examiner* — Daniel F Hajnik
*Assistant Examiner* — Jed-Justin Imperial
(74) *Attorney, Agent, or Firm* — XSENSUS LLP

(57) ABSTRACT

The present disclosure relates to a method for efficiently compressing a dynamic 3D model sequence based on 4D fusion. In some embodiments, comprising: storing a 3D model of one frame of the dynamic 3D model sequence as a reference model; determining an initial correspondence between vertices of the reference model and a target model to align the reference model and the target model by optimizing an energy function of the reference model so as to obtain initialized fusion parameters, wherein the target model is a 3D model of remaining frames of the dynamic 3D model sequence; and determining the final fusion parameters
(Continued)

Store the 3D model of one frame of the dynamic 3D model sequence as a reference model

701

Determine an initial correspondence between the vertices of the reference model and the target model by optimizing an energy function of the reference model so that the reference model and the target model are aligned to obtain initialized fusion parameters

702

Iteratively optimize the initialized fusion parameters to determine the final fusion parameters for transforming the reference model into the target model

703

Restore the target model sequence by deforming the reference model through the obtained final fusion parameters

704 for deforming the reference model into the target model by iteratively optimizing the initialized fusion parameters.

18 Claims, 11 Drawing Sheets

(52) U.S. Cl.
CPC ................ *G06T 2219/2004* (2013.01); *G06T 2219/2016* (2013.01); *G06T 2219/2021* (2013.01)

(56) References Cited

OTHER PUBLICATIONS

Sumner et al., "Embedded Deformation for Shape Manipulation", ACM SIGGRAPH 2007, vol. 26, Issue 3, Jul. 29, 2007, 7 pages.
International Search Report and Written Opinion mailed on Nov. 10, 2022, received for PCT Application PCT/CN2022/116952, filed on Sep. 5, 2022, 09 pages including English Translation.

* cited by examiner

A dynamic 3D model sequence created by a voxel capture system

METHOD, DEVICE AND STORAGE MEDIUM FOR EFFICIENTLY COMPRESSING A DYNAMIC 3D MODEL SEQUENCE BASED ON 4D FUSION

CROSS-REFERENCE TO RELATED APPLICATIONS

The present application is based on PCT filing PCT/CN2022/116952, filed Sep. 5, 2022, which claims priority to Chinese Patent Application No. 202111052737.4, filed Sep. 9, 2021, the entire contents of each are incorporated herein by reference.

TECHNICAL FIELD

The present disclosure relates generally to the field of image processing, and in particular, to a method for efficiently compressing a dynamic 3D model sequence.

BACKGROUND

In recent years, with the development and widespread application of the field of image processing, various techniques have been used to generate 3D content. In particular, generating 3D content that evolves over time has attracted much attention in both academia and industry, such as voxel capture systems that capture complete 3D content containing real human behavior. A voxel capture system captures 2D images of real-world objects from multiple angles using a calibrated camera array, extracts the foreground from the 2D images and uses algorithms (e.g., visual hull) to generate mesh models, and maps mesh models using multiple images and camera parameters so as to generate real-world 3D content.

SUMMARY

One aspect of the present disclosure relates to a method for efficiently compressing a dynamic 3D model sequence, comprising storing a 3D model of one frame of the dynamic 3D model sequence as a reference model; determining an initial correspondence between vertices of the reference model and a target model to align the reference model and the target model by optimizing an energy function of the reference model so as to obtain initialized fusion parameters, wherein the target model is a 3D model of remaining frames of the dynamic 3D model sequence; and determining the final fusion parameters for deforming the reference model into the target model by iteratively optimizing the initialized fusion parameters.

Preferably, the method comprises, determining an initial correspondence between vertices of the reference model and a target model to align the reference model and the target model by optimizing an energy function of the reference model further comprising dividing the vertices of the reference model into a plurality of blocks, searching for the corresponding point of the vertex of the reference model in the target model through an Iterative Closest Point (ICP) algorithm for each vertex in the block in units of blocks, so as to solve a rigid transformation of a block in the reference model transforming to the target model, wherein the rigid transformation includes a translation vector t and a rotation vector R.

Preferably, the method comprises, in the Iterative Closest Point (ICP) algorithm, searching for an initial corresponding point of the vertex of the reference model in the target model through normal projection, the normal projection being based on the distance from a point to a line being the minimum.

Preferably, the method comprises determining a vertex $x^0$ representing the rigid motion of the blocks of the reference model when partitioning the blocks.

Preferably, the method comprises calculating the position point $x_c=Rx^0+t$ of the vertex $x^0$ in the target model using the translation vector t and the rotation vector R of the rigid transformation obtained by the Iterative Closest Point (ICP) algorithm, wherein $x_c$ represents a position constraint for the vertex $x^0$ moving to the point $x_c$ after the rigid transformation.

Preferably, the method comprises constructing a position constraint function $\|W_c(x-x_c)\|^2$ using the position constraints calculated by each block, and constructing a Laplacian energy function $\|Lx-Lx^0\|^2$, and optimizing the energy function:

$$E=\left\|Lx-Lx^0\right\|^2+\|W_c(x-x_c)\|^2$$

Wherein L is a Laplacian matrix, $W_c$ is a weight matrix of the position constraints, $x^0$ is the initial position of the vertex of the reference model, and $x_c$ is the position constraint of the vertex of the reference model, which is the corresponding vertex position of the vertex of the reference model in the target model.

Preferably, the method comprises randomly sampling a plurality of control points from the vertices of the reference model, and using weighting of an affine transformation of the control points to represent the deformation of the vertices in the reference model $$\tilde{v}_j=\sum_{i=i}^{m} w_i(v_j)t_i(v_j).$$

Preferably, the method comprises initializing fusion parameters of the control points by model alignment.

Preferably, the method comprises constructing the position constraint $E_c$ of the vertex through the nearest neighbor compatible point search algorithm in iterative optimization, so as to find a corresponding point in the target model that can exactly match the vertex in the reference model.

Preferably, the method comprises optimizing an energy function $w_tE_t+w_rE_r+w_cE_c$ of model fusion composed of vertex position constraints $E_c$ before and after deformation of the reference model, constraints $E_t$ of affine transformation parameters, and regularization items $E_r$ to obtain the final optimized fusion parameters.

One aspect of the present disclosure relates to a device for efficiently compressing a dynamic 3D model sequence, comprising a non-transitory memory for storing an application program, a processor, and a computer program stored in the non-transitory memory and running on the processor, which is executed by the processor to implement: storing a 3D model of one frame of the dynamic 3D model sequence as a reference model; determining an initial correspondence between vertices of the reference model and a target model to substantially align the reference model and the target model by optimizing an energy function of the reference model so as to obtain initialized fusion parameters, wherein the target model is a 3D model of remaining frames of the dynamic 3D model sequence; and determining the final fusion parameters for deforming the reference model into the target model through an iterative optimization method.

Preferably, the processor further executes the computer program to: divide the vertices of the reference model into a plurality of blocks, and search for the corresponding point of the vertex of the reference model in the target model through an Iterative Closest Point (ICP) algorithm for each vertex in the block in units of blocks, so as to solve a rigid transformation of a block in the reference model transforming to the target model, wherein the rigid transformation includes a translation vector t and a rotation vector R.

Preferably, the processor further executes the computer program to: in the Iterative Closest Point (ICP) algorithm, search for a corresponding point of the vertex of the reference model in the target model through normal projection, the normal projection being based on the distance from a point to a line being the minimum.

Preferably, the processor further executes the computer program to: determine a vertex $x^0$ representing the rigid motion of the blocks of the reference model when partitioning the blocks.

Preferably, the processor further executes the computer program to: calculate the position point $x_c=Rx^0+t$ of the vertex $x^0$ in the target model using the translation vector t and the rotation vector R of the rigid transformation obtained by the Iterative Closest Point (ICP) algorithm, wherein $x_c$ represents a position constraint for the vertex $x^0$ moving to the point $x_c$ after the transformation.

Preferably, the processor further executes the computer program to: construct a position constraint function $\|W_c(x-x_c)\|^2$ using the position constraints calculated by each block, and constructing a Laplacian energy function $\|Lx-Lx^0\|^2$, and optimizing the energy function:

$$E=\|Lx-Lx^0\|^2+\|W_c(x-x_c)\|^2$$

Wherein L is a Laplacian matrix, $W_c$ is a weight matrix of the position constraints, $x^0$ is the initial position of the vertex of the reference model, and $x_c$ is the position constraint of the vertex of the reference model, which is the corresponding vertex position of the vertex of the reference model in the target model.

Preferably, the processor further executes the computer program to: randomly sample a plurality of control points from the vertices of the reference model, and use weighting of an affine transformation of the control points to represent the deformation of the vertices in the reference model $$\tilde{v}_j=\sum_{i=i}^{m}w_i(v_j)t_i(v_j).$$

Preferably, the processor further executes the computer program to: initialize fusion parameters of the control points by model alignment.

Preferably, the processor further executes the computer program to: construct the position constraint $E_c$ of the vertex through the nearest neighbor compatible point search algorithm in iterative optimization, so as to find a corresponding point in the target model that can exactly match the vertex in the reference model.

Preferably, the processor further executes the computer program to: optimize an energy function $w_rE_r+w_rE_r+w_cE_c$ of model fusion composed of vertex position constraints $E_c$ before and after deformation of the reference model, constraints $E_t$ of affine transformation parameters, and regularization items $E_r$ to obtain the optimized fusion parameters.

One aspect of the present disclosure relates to a voxel capture system, comprising: a capturing unit that acquires a plurality of 2D images of an object in time series from multiple angles by using a calibrated camera array; a modeling unit that extracts the foreground from the plurality of 2D images, and constructs a dynamic 3D model sequence using an algorithm; a dynamic 3D model sequence compressing unit that obtains fusion parameters to compress the dynamic 3D model sequence according to the method of at least one of claims 1-10; and a restoring unit that restores the dynamic 3D model sequence according to the fusion parameters obtained from the dynamic 3D model sequence compressing unit.

One aspect of the present disclosure relates to a non-transitory machine-readable storage medium comprising instructions that, when executed by one or more processors of a machine, cause the machine to perform operations: storing a 3D model of one frame of the dynamic 3D model sequence as a reference model; determining an initial correspondence between vertices of the reference model and a target model to substantially align the reference model and the target model by optimizing an energy function of the reference model so as to obtain initialized fusion parameters, wherein the target model is a 3D model of remaining frames of the dynamic 3D model sequence; and determining the final fusion parameters for transforming the reference model into the target model through an iterative optimization method.

The foregoing summary is provided to summarize some exemplary embodiments in order to provide a basic understanding of aspects of the subject matter described herein. Accordingly, the above features are examples only and should not be construed to narrow the scope or spirit of the subject matter described herein in any way. Other features, aspects, and advantages of the subject matter described herein will become apparent from the following detailed description described in conjunction with the accompanying drawings.

BRIEF DESCRIPTION OF THE DRAWINGS

A better understanding of the present disclosure may be obtained when considering the following detailed description of the embodiments in conjunction with the accompanying drawings. The same or similar reference numerals are used throughout the drawings to denote the same or similar components. The accompanying drawings, along with the following detailed description, are incorporated in and form a part of this specification, and serve to illustrate embodiments of the disclosure and explain principles and advantages of the disclosure. Wherein.

Figure 1:
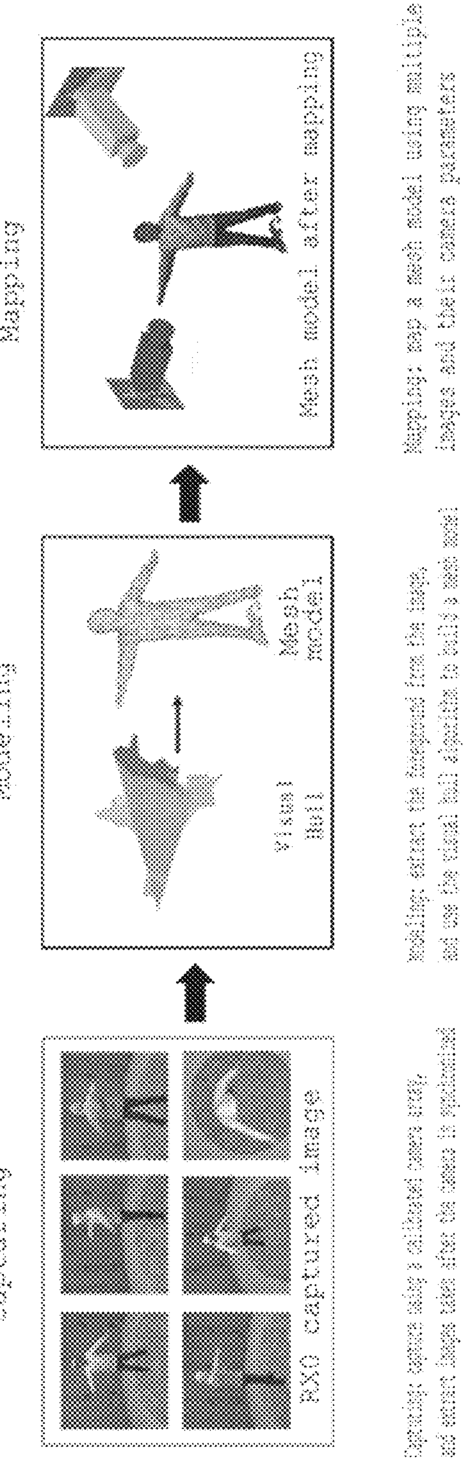
FIG. 1 shows a voxel capture system of related art.

While the embodiments described in this disclosure may be susceptible to various modifications and alternatives, specific embodiments thereof are shown by way of example in the drawings and described in detail herein. It should be understood, however, that the drawings and detailed description thereto are not to limit the embodiments to the particular forms disclosed, on the contrary, it is intended to cover all modifications, equivalents and alternatives falling within the spirit and scope of the claims.

DETAILED DESCRIPTION

Representative applications of aspects such as devices and methods according to the present disclosure are described below. These examples are described only to add context and to assist in understanding the described embodiments. Therefore, it will be apparent to those skilled in the art that the embodiments described below may be practiced without some or all of the specific details. In other instances, well known process steps have not been described in detail to avoid unnecessarily obscuring the described embodiments. Other applications are possible and the aspects of the present disclosure are not limited to these examples.

A voxel capture system captures 2D images of real-world objects from multiple angles using a calibrated camera array, extracts the foreground from the 2D images and uses algorithms (e.g., visual hull) to generate mesh models, and maps mesh models using multiple images and camera parameters so as to generate real-world 3D content.

But current voxel capture systems output a 3D model for each frame captured. If it is required to create a dynamic 3D model sequence of 10 seconds to 15 seconds, a large amount of 3D model data will be generated, making it difficult to export these data to other applications. For example, if a single 3D model requires 5 M of storage space, a dynamic 3D model sequence with a duration of 15 seconds and a frame rate of 30 frames per second requires about 2 GB of storage space. This is difficult for mobile applications to transfer and store.

The method for efficiently compressing a dynamic 3D model sequence based on 4D fusion proposed in the present disclosure fits a 3D model sequence by acquiring a small number of fusion parameters, thereby greatly compressing the 3D model sequence.

FIG. 1 shows a voxel capture system of related art. The voxel capture system of related art includes steps of capturing, modeling and mapping, etc. In the capturing step (see the left image in FIG. 1), multiple images are collected from multiple directions (e.g., front, back, left, right, top, etc. as shown in FIG. 1) using a calibrated camera array. In the modeling step (see the middle image in FIG. 1), foreground contours are extracted from multiple captured images, and a network model is built using a visual hull algorithm. The visible hull algorithm realizes the 3D reconstruction of a real object utilizing the silhouette contour line of the real object on the photo and relevant camera parameters. In short, the visible hull is a convex hull of a space object determined by all known silhouette contour lines of that object. When observing a certain space object from multiple viewing angles using perspective projection, a silhouette contour line of the object will be obtained at each viewing angle. This silhouette contour line and corresponding projected silhouette center will collectively define a generally shaped cone in 3D space. Obviously, the object must fall into this cone, while an intersection of cones determined by all known silhouette contour lines and corresponding perspective projection centers will finally determine a convex hull containing the object, and the convex hull is a visible hull of an object. This visible hull is thereafter used to generate a 3D mesh model. In the mapping step (see right image in FIG. 1), the mesh model is mapped using the multiple images and camera parameters thereof, so that the mesh model is colored.

Figure 2:
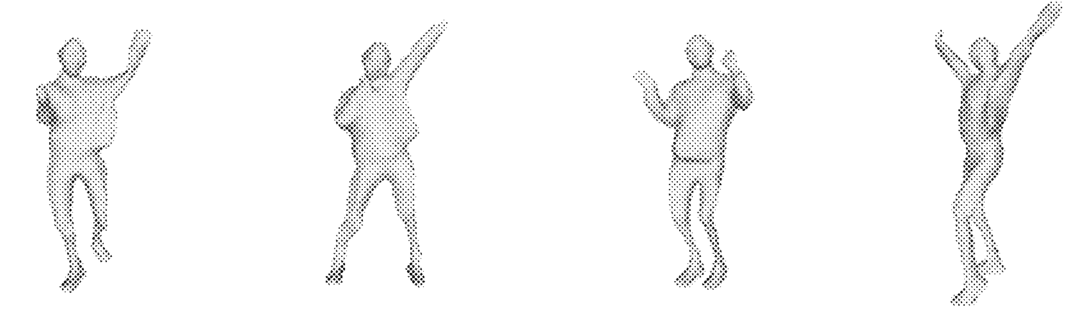
FIG. 2 shows a dynamic 3D model sequence created by a voxel capture system.

In the current voxel capture system as described above, a 3D model is output for each frame captured, so a sequence of images will generate a large number of 3D models. FIG. 2 shows a dynamic 3D model sequence created by a voxel capture system. If it is required to create a dynamic 3D model sequence of, for example, 10 seconds to 15 seconds, a large amount of 3D data will be generated, making it difficult to export these data to other applications. Assuming that a single 3D model requires 5M storage space, a dynamic 3D model sequence with a duration of 15 seconds and a frame rate of 30 frames per second requires about 2 GB of storage space, which is difficult for mobile applications to transfer and store.

Figure 3:
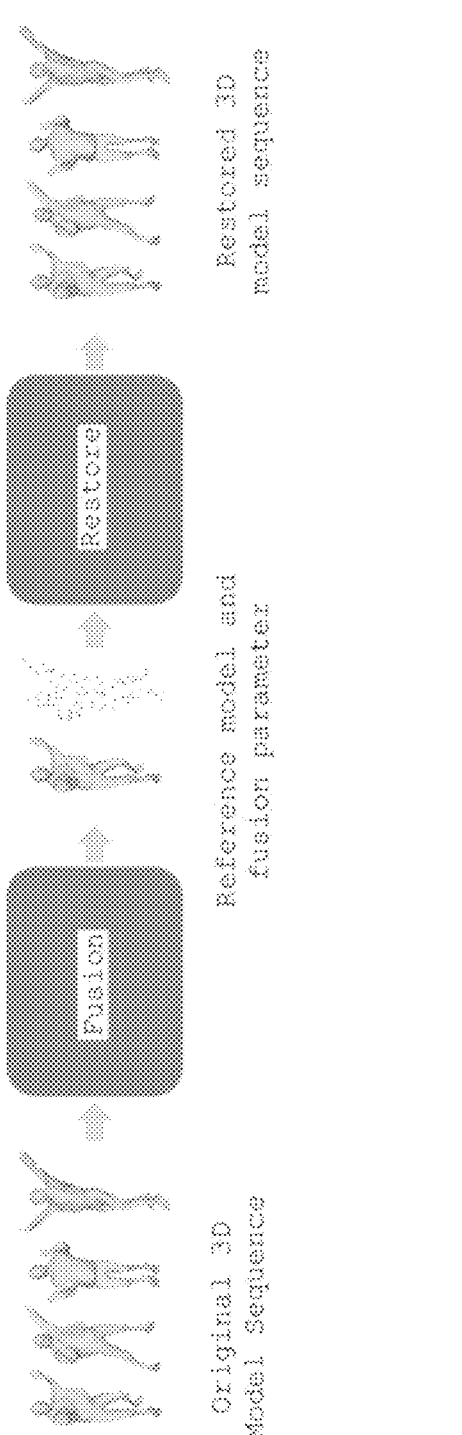
FIG. 3 shows a flowchart of compressing a dynamic 3D model sequence based on 4D fusion according to an embodiment of the present disclosure.

Therefore, the present disclosure proposes a method for efficiently compressing a dynamic 3D model sequence. The technical solution of compressing a dynamic 3D model sequence based on 4D fusion according to an embodiment of the present disclosure will be described below with reference to FIG. 3. The method for compressing a dynamic 3D model sequence based on 4D fusion proposed in this disclosure can use a 4D fusion compression algorithm to obtain a small number of fusion parameters according to reference models and target models in the original 3D model sequence. It is possible for the small number of fusion parameters to control deformation of the reference model to fit the subsequent target model, so that the target model can be restored later by only storing this small number of fusion parameters, instead of storing the 3D sequence itself of the target model. For the purpose of illustration, FIG. 3 shows only an original 3D model sequence with four frames. It can be understood that the original 3D model sequence to be compressed is not limited to four frames. In some embodiments of the present disclosure, the method for compressing a dynamic 3D model sequence comprises storing the 3D model of the first frame in the original dynamic 3D model sequence as a reference model, and those of the subsequent second frame, third frame and fourth frame are target models to be fitted. It should be noted that the present disclosure is not limited to storing the first frame as a reference model and storing subsequent frames as target models. This disclosure includes all possible implementations of storing any frame or frames as reference model(s) and the remaining frames as target models. Further, in the present disclosure, the remaining frames serving as target models do not have to be located behind the frame serving as a reference model, and the remaining frames serving as the target models and the frame serving as the reference model may have any front and back relative positions.

The algorithm of compressing a dynamic 3D model sequence based on 4D fusion proposed in this disclosure mainly consists of two parts: model alignment and model fusion. The model alignment is used to align the reference model and the target model, that is, to determine the initial correspondence between the vertices of the reference model and the target model by optimizing an energy function of the reference model so that the reference model and the target model are aligned to obtain the initial fusion parameters; the model fusion is used to extract fusion parameters from aligned reference models, that is, after obtaining the initial fusion parameters from the model alignment, 4D fusion parameters for deforming the reference model into the target model are determined by iteratively optimizing the obtained initialized fusion parameters. Compared with voxel capture systems that store 3D models for each frame, the 4D fusion compression algorithm greatly compresses dynamic 3D model sequences by controlling the deformation of the reference model with a small number of fusion parameters to fit subsequent target models.

Model Alignment

Figure 4:
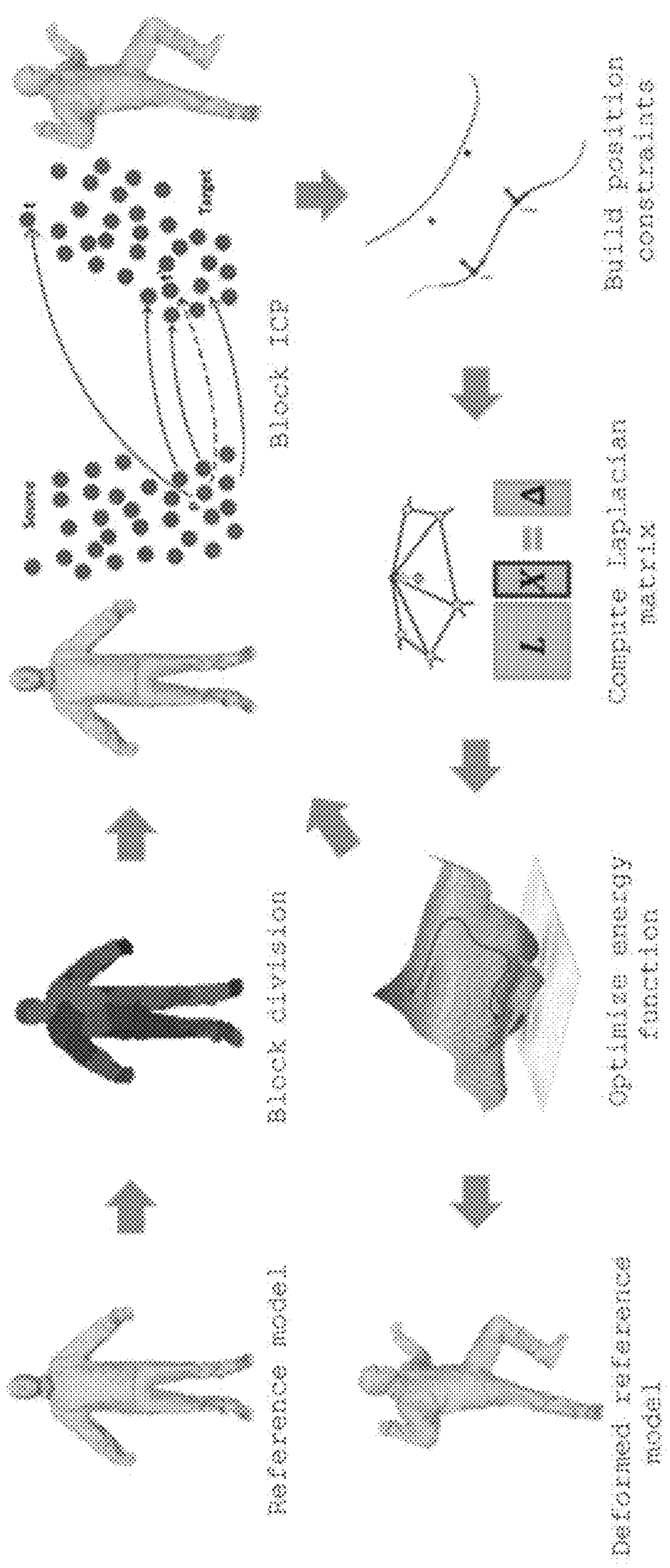
FIG. 4 shows a flowchart of model alignment steps of compressing a dynamic 3D model sequence based on 4D fusion according to an embodiment of the present disclosure.

The model alignment step in the method for compressing a dynamic 3D model sequence according to an embodiment of the present disclosure will be described below with reference to FIG. 4. In a dynamic 3D model sequence, the model of each frame may have a different model structure. The model alignment step is used to find an initial correspondence between vertices of a reference model and a target model. Model alignment makes the geometric structure of the reference model closer to the target model by moving the position of the vertex of the reference model, so as to find position constraints of the points in the reference model in the target model.

The method for compressing a dynamic 3D model sequence proposed in the present disclosure includes determining an initial correspondence between vertices of a reference model and a target model by optimizing an energy function of the reference model so that the reference model and the target model are aligned to obtain the initial fusion parameters.

According to some embodiments of the present disclosure, in the model alignment step, in order to increase the stability of model transformation, a reference model will not approach a target model in units of vertices. As shown in FIG. 4, the reference model will be divided into a plurality of blocks, assuming that the transformation of each block from the reference model to the target model is a rigid transformation, that is, the transformation only includes translation and rotation. Then, searching for the correspondence with each vertex in the reference model in the target model in units of blocks through an Iterative Closest Point (ICP) algorithm, so as to solve the translation t and rotation R required for the block in the reference model transforming to the target model. In the Iterative Closest Point (ICP) algorithm, the target model remains unchanged, and the vertices of the transformed reference model is made to coincide with corresponding points of the target model as much as possible through transformation of translation t and rotation R.

As mentioned above, the vertices of the reference model are divided into a plurality of blocks, and for each vertex in a block, the Iterative Closest Point (ICP) algorithm is used to find the best corresponding point in the target model, so as to solve a rigid transformation of a block in the reference model transforming to the target model, wherein the rigid transformation includes a translation vector t and a rotation vector R.

The ICP algorithm is the optimal registration method based on the least squares method. The algorithm repeatedly selects correspondence point pairs and calculates the optimal rigid transformation until convergence accuracy requirements for correct registration are met. The purpose of the ICP algorithm is to find the translation t and rotation R between the corresponding points of the reference model and the target model, so that the data of the corresponding points meet the optimal match under a certain measurement criterion.

Figure 5:
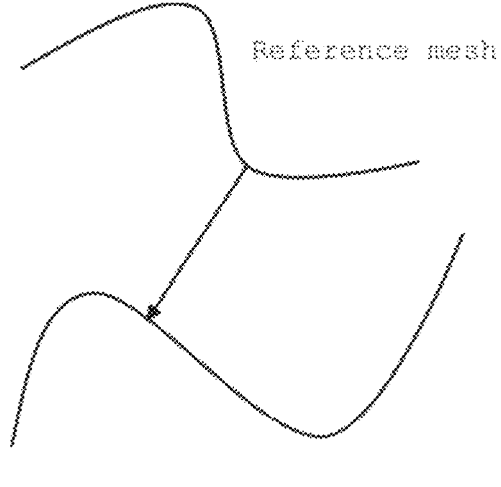
FIG. 5 shows a schematic diagram of finding corresponding points in a target model through normal projection according to an embodiment of the present disclosure.

In the ICP algorithm, for each vertex in the block of the reference model, it is first necessary to find an initial corresponding point in the target block. In the embodiment of the present disclosure, the method of normal projection is used for each vertex in the block to find the initial corresponding point in the target model. FIG. 5 shows an exemplary method of finding corresponding points in a target model through normal projection according to an embodiment of the present disclosure. Normal projection projects vertices of a reference model along the normal and intersects the vertices of the target model to find the initial corresponding point in the target model. The normal projection is based on the distance from a point to a line being the minimum, and the straight line is composed of the vertex and the normal vectors. It can be understood that the normal projection method is shown as an example only, and the present disclosure is not limited to using the normal projection method to find the initial corresponding point.

After determining the initial corresponding point of each vertex in the block of the reference model in the target model, the ICP algorithm is used to obtain the translation t and rotation R that minimizes the distance between the vertex of the reference model and the corresponding point of the target model, that is, the point obtained after applying this translation t and rotation R to the vertex of the reference model has the smallest distance from the corresponding point of the target model. In the ICP algorithm, the translation t and rotation R are applied to the vertices in the reference model to obtain the transformed reference model. Afterwards, if the transformed reference model and the target model meet the average distance being less than a certain threshold, the iteration will stop; if the threshold condition is not met, the iteration will continue with the transformed reference model serving as a new starting point until the distance from the corresponding point of the target model being less than a predetermined threshold is met, where in each iteration of the ICP algorithm the corresponding point in the optimal target model is recalculated.

Find the vertex $x^0$ that best represents the rigid motion of a block of the reference model, and by solving translation t and rotation R for the block of the reference model transforming to the target model (i.e., rigid transformation) using the ICP algorithm, calculate the target position of the vertex $x^0$:$x_c=Rx^0+t$. Wherein, $x_c$ is the position constraint, which represents the position $x^0$ to be moved to $x_c$ after optimization.

The vertex $x^0$ that best represents the rigid motion of a block of the reference model are determined during block partition. By "the vertex that best represents the rigid motion of the block", it can refer to the following explanation: if the block of the reference model is transformed in accordance with the rigid transformation of the most representative vertex $x^0$, other vertices in the block can substantially align to their corresponding positions in the target model. When dividing the blocks, several vertices that evenly sampled from the reference model according to the geodesic distance using the farthest point sampling method are considered as representative points for each block $x^0$, and then the representative points are divided into different blocks according to the shortest distance from the remaining vertices to the representative points, thereby completing the division of the reference model.

Position constraints calculated by using each block are used to construct a position constraint energy function $\|W_c(x-x_c)\|^2$. Specifically, position constraints of the center of each block are obtained by averaging the rigid transformation of each block. Position constraints calculated by using each block are used to construct a position constraint energy function $\|W_c(x-x_c)\|^2$. In addition, since the transformation of the block from the reference model to the target model is assumed to be a rigid transformation, in order to limit the freedom of vertex movement, the Laplacian energy function $\|Lx-Lx^0\|^2$ is introduced to keep the local rigid shape of the block unchanged.

Therefore, as mentioned above, the energy function of the reference model in the model alignment process is composed of the position constraint energy function and the Laplacian energy function:

$$E=\|Lx-Lx^0\|^2+\|W_c(x-x_c)\|^2$$

Wherein, L is the Laplacian matrix, x is the transformed position of the operated point in the reference model, $x^0$ is the vertex in the block of the reference model that can best represent the rigid motion, $x_c$ is the position constraint of the vertex $x^0$ of the reference model (which is the transformation of the vertex $x^0$ of the reference model to the position of corresponding point in the target model), and $W_c$ is the weight matrix of position constraints (when the vertex is the vertex $x^0$ that can best represent the rigid motion in the block of the reference model, $W_c=1$, and when the vertex is not the vertex $x^0$ that can best represent the rigid motion in the block of the reference model, $W_c=0$).

Optimizing the energy function composed of the position energy function and the Laplacian energy function has made it satisfy a predetermined condition (for example, less than a predetermined threshold), so that the reference model and the target model are substantially aligned, that is, a deformed reference model is obtained. After the reference model and the target model are substantially aligned, the rigid transformation relationship (that is, translation t and rotation R) from the reference model to the target model can be acquired for the reference model to obtain initial fusion parameters for use by subsequent model fusion step.

Figure 6:
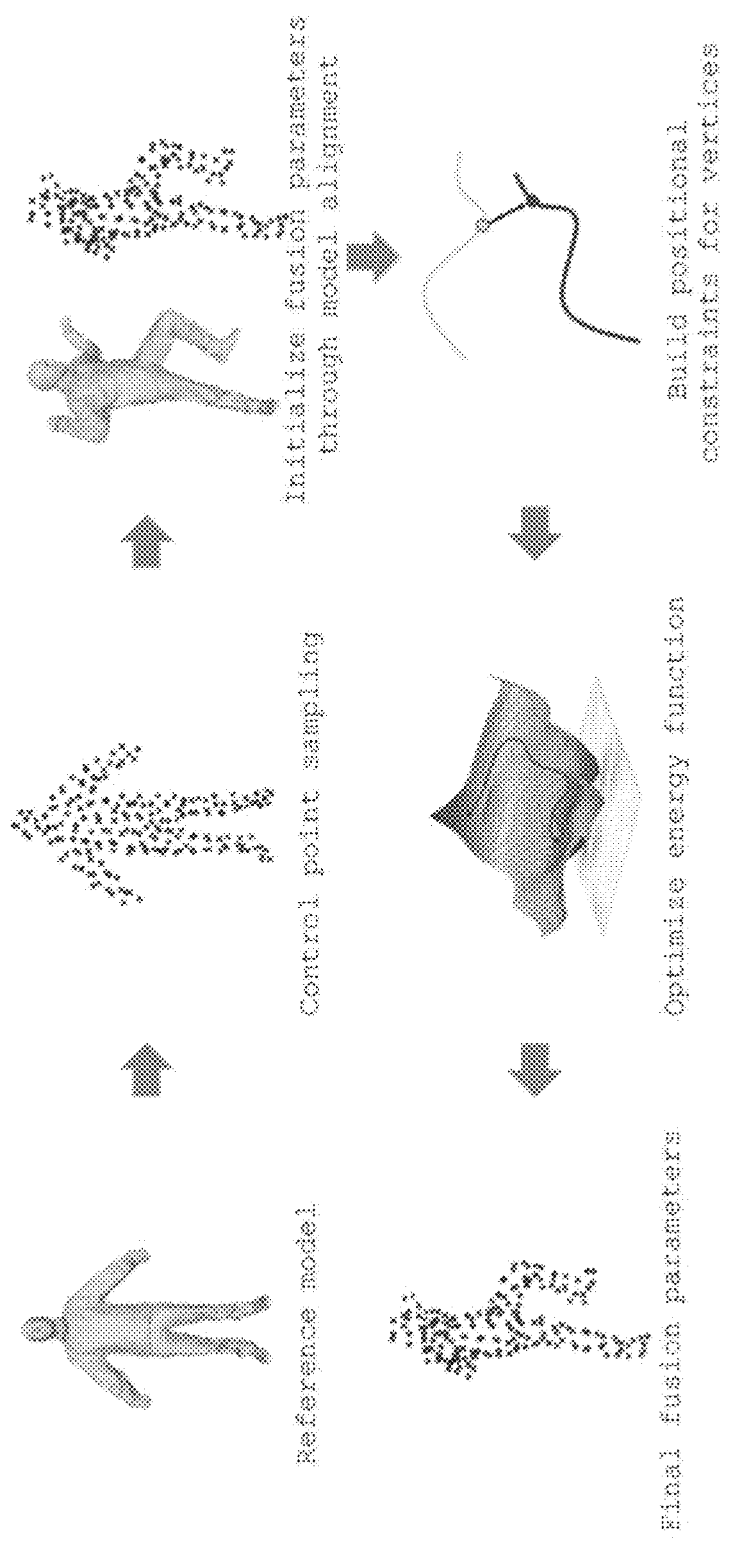
FIG. 6 shows a flowchart of model fusion steps of compressing a dynamic 3D model sequence based on 4D fusion according to an embodiment of the present disclosure.

The model fusion step in the method for efficiently compressing a dynamic 3D model sequence according to an embodiment of the present disclosure will be described below with reference to FIG. 6. After obtaining the initial correspondence from the reference model to the target model in the model alignment step, in the model fusion step, the reference model can find the final fusion parameters that transform the reference model into the target model through an iterative optimization-based method. Therefore, through the model fusion step, it may use only few fusion parameters to represent the deformation of the reference model during model alignment, which is the key to enable 3D sequence compression. Model fusion assumes that the model deformation is a rigid transformation in a small block, so a set of affine transformations acting on a local small area can be used to complete the non-rigid transformation of the model.

Model fusion will randomly sample some control points in the vertices of the reference model, and set an affine transformation for each control point to represent the rigid transformation of this local small area. In order to have a better model deformation, the distribution of control points should roughly follow the geometry of the reference model to ensure that the control points are evenly distributed on the reference model. FIG. 6 exemplarily shows the sampling of control points, which basically follows the geometric construction of the human body. The model fusion step samples a limited number of control points from the vertices, and only initializes fusion parameters of the control points through the model alignment step, which reduces the amount of calculation and improves the fusion efficiency compared with initializing fusion parameters of all vertices.

By randomly sampling multiple control points from the vertices of the reference model, the weighting of the affine transformation of the control points are used to represent position constraints of the vertices $v_j$ in the reference model. During the deformation process from the reference model to the target model, one vertex $v_j$ can be affected by multiple adjacent control points, so the final position of the vertex $v_j$ is to use linear blending to sum the affine transformation $t(\cdot)$ of multiple control points acting on the vertex $v_j$ through weights $w(\cdot)$. Thus, the position of the vertices $v_j$ in the reference model in the deformed reference model is determined by $\tilde{v}_j$:

$$\tilde{v}_j=\sum_{i=1}^{m}w_i(v_j)t_i(v_j)$$

where $t_i(v_j)$ is the transformation parameter of the control point, $w_i(v_j)$ is the weight of the control point and is related to the distance from the control point to the vertex $v_j$, and the vertex $v_j$ is affected by the surrounding i=m control points.

The fusion parameters of the control points are initialized through the deformed reference model in the model alignment. Note that what are initialized herein are fusion parameters of the control points in the reference model. In the previous model alignment step, what have been optimized by the alignment step are positions of the vertices x of the reference model; while in the current model fusion step, the optimized vertex position x is used to initialize the affine transformation relationship of the fusion parameters of the control points.

In the iterative optimization, position constraints of the vertices are constructed by the nearest neighbor compatible point search algorithm, so as to find the corresponding points in the target model that can accurately match the vertices in the reference model.

The energy function of model fusion can be obtained by constructing the constraint items $E_t$ of affine transformation parameters and regularization items $E_r$, as well as the vertex position constraints $E_c$ before and after deformation of the reference model:

$$E=w_tE_t+w_rE_r+w_cE_c$$

$w_t$, $w_r$ and $w_c$ are weight matrices of constraint items $E_t$ of the affine transformation parameters, regular items $E_r$, and vertex position constraint items $E_c$, respectively. By optimizing the energy function of model fusion to obtain a minimum value, the final fusion parameters can be obtained.

Figure 7A:
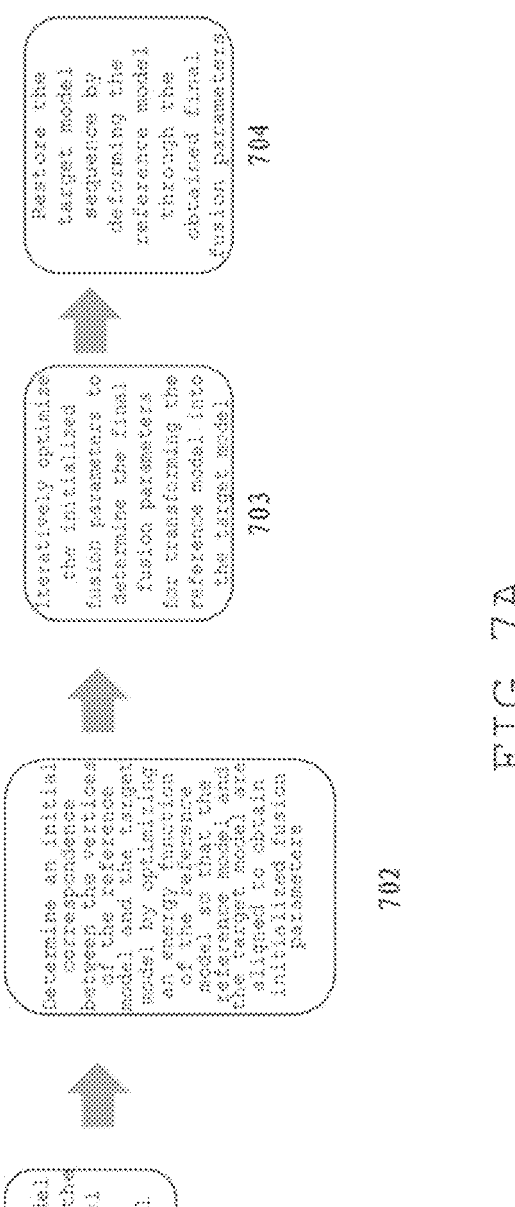
FIG. 7A-7C show a flow diagram for implementing an efficient compressed dynamic 3D model sequence according to an embodiment of the present disclosure.
Figure 7B:
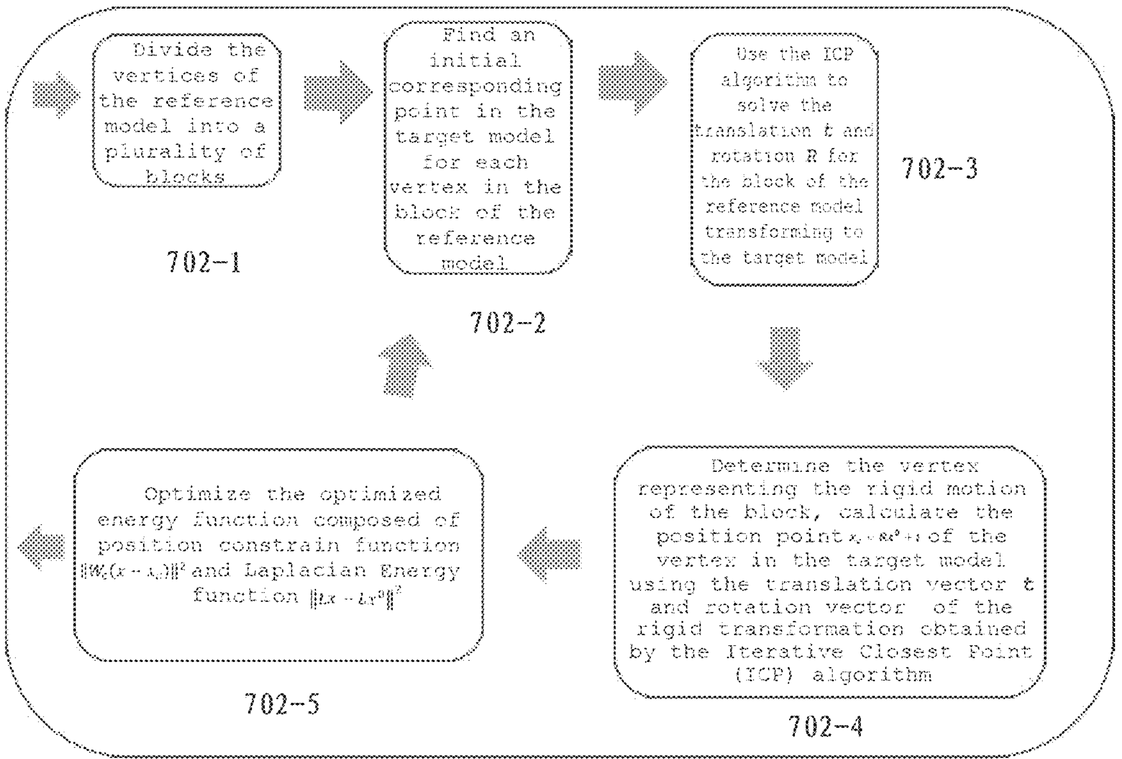
Figure 7C:
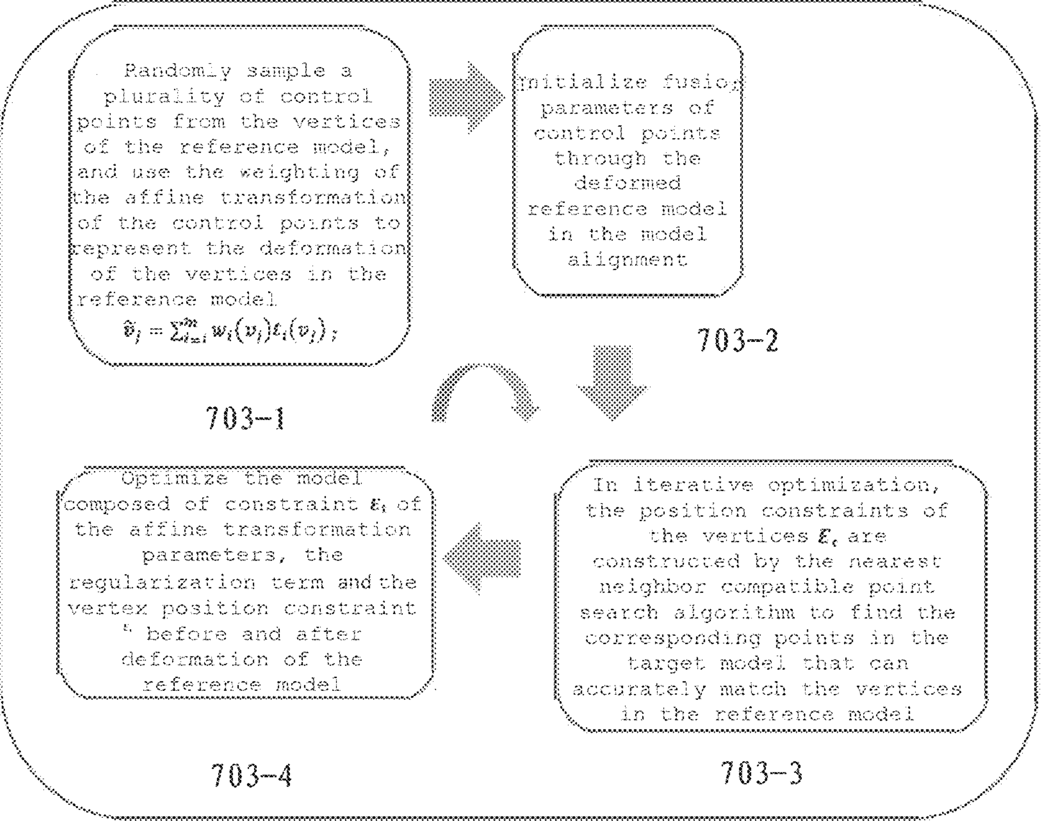

FIG. 7A-7C show a flow diagram for implementing an efficient compressed dynamic 3D model sequences according to an embodiment of the present disclosure.

Referring to FIG. 7A, at step 701, the 3D model of one frame of the dynamic 3D model sequence is stored as a reference model. Wherein, 3D models of the remaining frames of the dynamic 3D model sequence are regarded as target models.

In step 702, an initial correspondence between the vertices of the reference model and the target models is determined by optimizing an energy function of the reference model so that the reference model and the target model are aligned to obtain initialized fusion parameters.

Referring to FIG. 7B, preferably, step 702 includes steps 702-1 to 702-5.

In step 702-1, according to some embodiments of the present disclosure, in order to increase the stability of model deformation, the vertices of the reference model are divided into a plurality of blocks.

In step 702-2, according to some embodiments of the present disclosure, assuming that the block is a rigid transformation, the normal projection method is used to find an initial corresponding point in the target model for each vertex in the block of the reference model. Normal projection projects vertices of the reference model along the normal, and intersects the vertices of the target model to find the correspondence by minimizing the distance from the point to the line. It can be understood that the normal projection method is shown as an example only, and the present disclosure is not limited to using the normal projection method to find the initial corresponding point. The best corresponding point is recalculated in each iteration of ICP.

In step 702-3, according to some embodiments of the present disclosure, the ICP algorithm is used to solve the translation t and rotation R for the block of the reference model transforming to the target model. In the ICP algorithm, the translation t and rotation R are applied to the vertices in the reference model x to obtain the transformed reference model. Afterwards, if the transformed reference model and the target model meet the average distance being less than a certain threshold, the iteration will stop; otherwise, the iteration will continue with the transformed reference model serving as a new starting point until the distance to the corresponding point of the target model being less than a predetermined threshold is met, where in each iteration of the ICP algorithm the corresponding point in the optimal target model is recalculated.

In step 702-4, the vertex $x^0$ that represents the rigid motion of the block is determined, and the translation vector t and rotation vector R of the rigid transformation obtained by the Iterative Closest Point (ICP) algorithm are used to calculate the position point $x_c=Rx^0+t$ of the vertex $x^0$ in the target model, wherein $x_c$ represents a position constraint for the vertex $x^0$ moving to the point $x_c$ after the rigid transformation. In fact, the vertices $x^0$ are determined during block partition. When dividing the blocks, several vertices that evenly sampled from the reference model according to the geodesic distance using the farthest point sampling method are considered as representative points for each block $x^0$, and then the representative points are divided into different blocks according to the shortest distance from the remaining vertices to the representative points, thereby completing the division of the reference model.

In step 702-5, according to some embodiments of the present disclosure, position constraints calculated by using each block are used to construct the position constraint function $\|W_c(x-x_c)\|^2$, and a Laplacian energy function $\|Lx-Lx^0\|^2$ is constructed to keep the local rigid shape unchanged. Wherein, L is the Laplacian matrix, x is the transformed position of the operated point in the reference model, $x^0$ is the initial position of the vertex in the block of the reference model that can best represent the rigid motion, $x_c$ is the position constraint of the vertex $x^0$ of the reference model (which is the corresponding vertex position of the vertex $x^0$ of the reference model in the target model), and $W_c$ is the weight matrix of position constraints (when the vertex is a block representative point, $W_c=1$, when the vertex is not a block representative point, $W_c=0$). The energy function composed of the position energy function and the Laplacian energy function of the reference model is optimized to meet a predetermined condition (for example, less than a predetermined threshold). Thus, the reference model and the target model are substantially aligned, that is, a deformed reference model is obtained. After the reference model and the target model are aligned, the rigid transformation relationship (translation t and rotation R) to the target model can be obtained for the reference model to obtain initial fusion parameters.

In step 703, iterative optimization is performed on the initial fusion parameters to determine the final fusion parameters for transforming the reference model into the target model.

Referring to FIG. 7C, preferably, step 703 includes steps 703-1 to 703-4.

In step 703-1, according to some embodiments of the present disclosure, a plurality of control points are randomly sampled from the vertices of the reference model, and the weighting of the affine transformation of the control points is used to represent the deformation of the vertices in the reference model $$\tilde{v}_j = \sum_{i=i}^{m} w_i(v_j)t_i(v_j).$$

For better model deformation, the distribution of control points should roughly follow the geometry of the reference model to ensure that the control points are evenly distributed on the reference model.

In step 703-2, according to some embodiments of the present disclosure, fusion parameters of the control points are initialized through the deformed reference model in the model alignment. Note that what are initialized herein are the fusion parameters of the control points in the reference model. In the previous model alignment step, what are optimized by the alignment is the vertex position x of the reference model; while in the current model fusion step, the optimized vertex position x is used to initialize the affine transformation relationship of the fusion parameters of the control points.

In step 703-3, according to some embodiments of the present disclosure, in iterative optimization, the nearest neighbor compatible point search algorithm is used to construct the position constraints $E_c$ of vertices, so as to find the corresponding points in the target model that can exactly match the vertices in the reference model.

In step 703-4, according to some embodiments of the present disclosure, the energy function $w_tE_t+w_rE_r+w_cE_c$ of the model fusion composed of constraint $E_t$ of affine transformation parameters, regularization term $E_r$ and the vertex position constraint $E_c$ before and after deformation of the reference model is optimized to obtain the final optimized fusion parameters. Wherein, $w_t$, $w_r$ and $w_c$ are the weight matrix of the constraint item $E_t$ of the affine transformation parameters, the regular item $E_r$ and the vertex position constraint item $E_c$, respectively. By optimizing the energy function of model fusion to obtain a minimum value, the final fusion parameters can be obtained.

In step 704, the target model sequence is restored by deforming the reference model through the obtained final fusion parameters. It can be understood that the target model restoration step in step 704 is not necessary for the method for efficiently compressing a dynamic 3D model sequence of the present disclosure.

Figure 8:
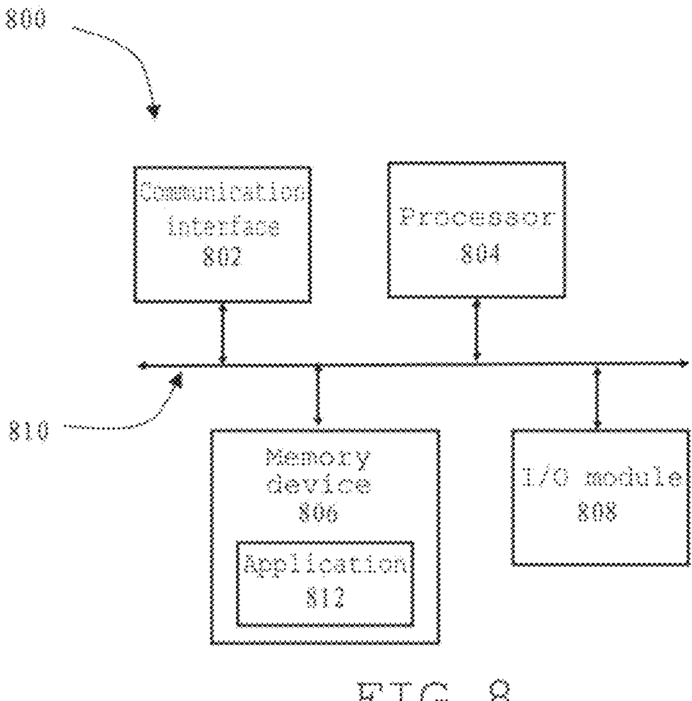
FIG. 8 shows a block diagram of a device configured to implement an efficient compressed dynamic 3D model sequence according to an embodiment of the present disclosure.

FIG. 8 shows a block diagram of a device configured to implement an efficient compressed dynamic 3D model sequence according to some embodiments. As shown in FIG. 8, computing device 800 may include a communication interface 802, a processor 804, a storage device 806, and an input/output ("I/O") module 808 communicatively coupled through a communication infrastructure 810. Although an exemplary computing device 800 is shown in FIG. 8, the components shown in FIG. 8 are not intended to be limiting. Additional or alternative components may be used in other embodiments. The components of computing device 800 shown in FIG. 8 will now be described in additional detail. Communication interface 802 may be configured to communicate with one or more computing devices. Examples of communication interface 802 include, but not limited to, a wired network interface (e.g., a network interface card), a wireless network interface (e.g., a wireless network interface card), a modem, an audio/video connection, and any other suitable interface. Processor 804 generally represents any type or form of processing unit capable of processing data or interpreting, executing and/or directing the performance of one or more instructions, procedures and/or operations described herein. Processor 804 may direct performance of operations in accordance with one or more application programs 812 or other computer-executable instructions, for example, instructions that may be stored in storage device 806 or another computer-readable medium. Storage device 806 may include one or more data storage media, devices or configurations and may take any type, form and combination of data storage media and/or devices. For example, storage devices 806 may include, but not limited to, hard disks, network drives, flash drives, magneto-optical disks, optical disks, RAM, dynamic RAM, other non-volatile and/or volatile data storage units, or combinations or sub-combinations thereof. Electronic data, including data described herein, may be stored temporarily and/or permanently in storage device 806. For example, data for one or more executable application programs 812 configured to instruct processor 804 to perform any of the operations described herein may be stored within the storage device 806. In some examples, data may be arranged in one or more databases residing within storage device 806. I/O module 808 may include one or more I/O modules configured to receive user input and provide user output. One or more I/O modules may be used to receive input for a single virtual experience. I/O module 808 may include any hardware, firmware, software, or combination thereof that supports input and output capabilities. For example, the I/O module 808 may include hardware and/or software for capturing user input, including but not limited to a keyboard or keypad, a touch screen component (e.g., a touch screen display), a receiver (e.g., an RF or infrared receiver), a motion sensor, and/or one or more input buttons. I/O module 808 may include one or more apparatus for presenting output to a user, including, but not limited to, a graphics engine, a display (e.g., a display screen), one or more output drivers (e.g., a display driver), one or more audio speakers and one or more audio drivers. In certain embodiments, the I/O module 808 is configured to provide graphical data to a display for presentation to a user. The graphical data may be representative of one or more graphical user interfaces and/or any other graphical content as may serve a particular implementation. In some examples, any of the facilities described herein may be implemented by or within one or more components of computing device 800. For example, one or more application programs 812 resident within storage device 806 may be configured to instruct processor 804 to perform one or more procedures or functions related to processing facility 204 of system 200. Likewise, storage facility 202 of system 200 may be implemented by or within storage device 806.

Figure 9:
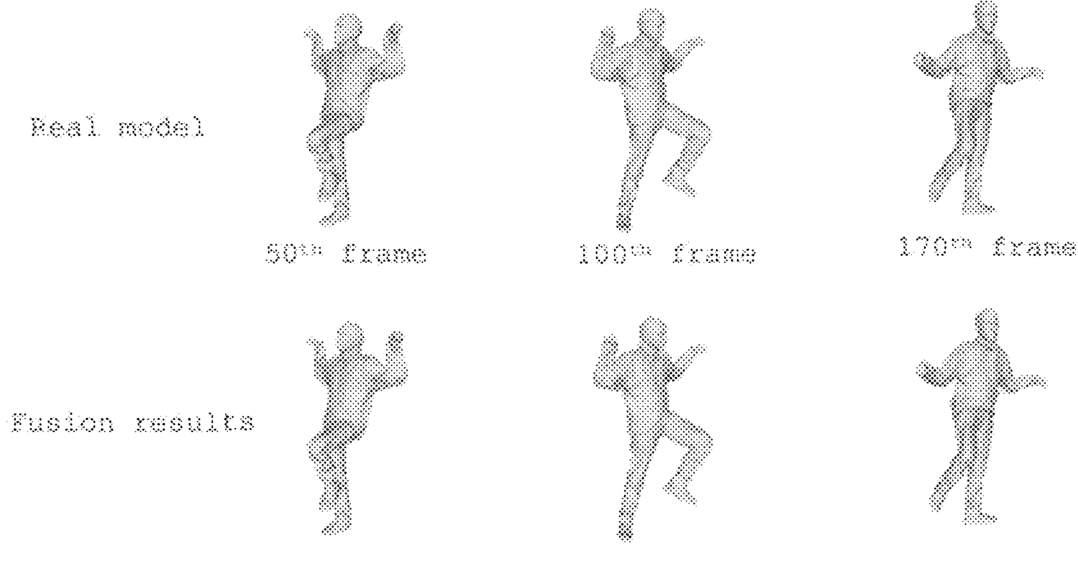
FIG. 9 shows a schematic diagram of the technical effect of compressing a dynamic 3D model sequence according to an embodiment of the present disclosure.

Technical effects in the method for compressing a dynamic 3D model sequence according to an embodiment of the present disclosure will be briefly introduced below with reference to FIG. 9. Since only some control points are randomly sampled in the model fusion step, and multiple neighboring control points are used to linearly blend the affine transformation of vertices of the reference model, the number of final fused parameters will depend on the number of control points. For example, in some embodiments of the present disclosure, assuming that 100 control points are randomly sampled, the number of fusion parameters will be 100×12, where 12 is the number of affine transformation coefficients (rotation and displacement). As shown in FIG. 9, using the disclosed method for compressing a dynamic 3D model sequence, for a model sequence of 150 frames, for the 4D fusion compression algorithm without mapping, it can achieve a compression rate of 5% compared to directly storing the real model; for the 4D fusion compression algorithm with mapping, it can achieve a compression rate of 44% compared with directly storing the real model.

It should be noted that the above units are only logical modules divided according to the specific functions they implement, and are not used to limit specific implementations, for example, they can be implemented in software, hardware, or a combination of software and hardware. In actual implementation, each of the above units may be implemented as an independent physical entity, or may also be implemented by a single entity (for example, a processor (CPU or DSP, etc.), integrated circuit, etc.). Wherein, a processing circuitry may refer to various implementations of digital, analog, or mixed-signal (combination of analog and digital) circuitry that performs functions in a computing system. Processing circuitry may include, for example, circuits such as integrated circuits (ICs), application specific integrated circuits (ASICs), portions or circuits of individual processor cores, entire processor cores, individual processors, programmable hardware devices such as field programmable gate arrays (FPGAs), and/or systems including multiple processors.

Various exemplary electronic devices and methods according to the embodiments of the present disclosure have been described above respectively. It should be understood that the operations or functions of these electronic devices may be combined with each other to realize more or less operations or functions than described. Operational steps of the various methods may also be combined with each other in any suitable order to similarly achieve more or fewer operations than described.

It should be understood that machine-readable storage medium or machine-executable instructions in a program product according to the embodiments of the present disclosure may be configured to perform operations corresponding to the above device and method embodiments. When referring to the above device and method embodiments, the embodiments of the machine-readable storage medium or the program product will be obvious to those skilled in the art, so the description thereof will not be repeated. Machine-readable storage media and program products for carrying or including the above machine-executable instructions also fall within the scope of the present disclosure. Such storage media may include, but not limited to, floppy disks, optical disks, magneto-optical disks, memory cards, memory sticks, and the like.

The exemplary embodiments of the present disclosure are described above with reference to the accompanying drawings, but the present disclosure is of course not limited to the above examples. A person skilled in the art may find various alterations and modifications within the scope of the appended claims, and it should be understood that they will naturally come under the technical scope of the present disclosure.

For example, a plurality of functions included in one unit in the above embodiments may be realized by separate apparatus. Alternatively, a plurality of functions implemented by a plurality of units in the above embodiments may be implemented by separate apparatus respectively. In addition, one of the above functions may be implemented by a plurality of units. Needless to say, such configurations are included in the technical scope of the present disclosure.

In this specification, the steps described in the flowcharts include not only processes performed in time series in the stated order but also processes performed in parallel or individually and not necessarily in time series. Furthermore, even in the steps processed in time series, needless to say, the order can be appropriately changed.

Although the present disclosure and its advantages have been described in detail, it should be understood that various changes, alternatives and replacements can be made hereto without departing from the spirit and scope of the disclosure as defined by the appended claims. Moreover, the terms "comprising", "including" or any other variation thereof in the embodiments of the present disclosure are intended to cover a non-exclusive inclusion such that a process, method, article, or device comprising a series of elements includes not only those elements, but also including other elements not expressly listed, or also including elements inherent in such process, method, article or device. Without further limitations, an element defined by the phrase "comprising a . . . " does not exclude the presence of additional identical elements in the process, method, article or device comprising said element.

Clause 1: A method for efficiently compressing a dynamic 3D model sequence, comprising storing a 3D model of one frame of the dynamic 3D model sequence as a reference model; determining an initial correspondence between vertices of the reference model and a target model to align the reference model and the target model by optimizing an energy function of the reference model so as to obtain initialized fusion parameters, wherein the target model is a 3D model of remaining frames of the dynamic 3D model sequence; and determining the final fusion parameters for deforming the reference model into the target model by iteratively optimizing the initialized fusion parameters.

Clause 2: The method according to Clause 1, wherein determining an initial correspondence between vertices of the reference model and a target model to align the reference model and the target model by optimizing an energy function of the reference model further comprising dividing the vertices of the reference model into a plurality of blocks, searching for the corresponding point of each vertex of the reference model in the target model through an Iterative Closest Point (ICP) algorithm for each vertex in the block in units of blocks, so as to solve a rigid transformation of a block in the reference model transforming to the target model, wherein the rigid transformation includes a translation vector t and a rotation vector R.

Clause 3: The method according to Clause 2, in the Iterative Closest Point (ICP) algorithm, an initial corresponding point of each vertex of the reference model in the target model is searched for through normal projection, the normal projection being based on the distance from a point to a line being the minimum.

Clause 4: The method according to Clause 2, a vertex $x^0$ representing the rigid motion of the blocks of the reference model is determined when partitioning the blocks.

Clause 5: The method according to Clause 4, the position point $x_c=Rx^0+t$ of the vertex $x^0$ in the target model is calculated using the translation vector t and the rotation vector R of the rigid transformation obtained by the Iterative Closest Point (ICP) algorithm, wherein $x_c$ represents a position constraint for the vertex $x^0$ moving to the point $x_c$ after the rigid transformation.

Clause 6: The method according to Clause 5, a position constraint function $\|W_c(x-x_c)\|^2$ is constructed using the position constraints calculated by each block, and a Laplacian energy function $\|Lx-Lx^0\|^2$ is constructed, and the energy function is optimized:

$$E = \left\|Lx - Lx^0\right\|^2 + \|W_c(x - x_c)\|^2$$

Wherein L is a Laplacian matrix, $W_c$ is a weight matrix of the position constraints, $x^0$ is the initial position of the vertex of the reference model, and $x_c$ is the position constraint of the vertex of the reference model, which is the corresponding vertex position of the vertex of the reference model in the target model.

Clause 7: The method according to Clause 1, a plurality of control points are randomly sampled from the vertices of the reference model, and weighting of an affine transformation of the control points is used to represent the deformation of the vertices in the reference model $$\tilde{v}_j = \sum_{i=i}^{m} w_i(v_j)t_i(v_j).$$

Clause 8: The method according to Clause 7, fusion parameters of the control points are initialized by model alignment.

Clause 9: The method according to Clause 8, the position constraint $E_r$ of the vertex is constructed through the nearest neighbor compatible point search algorithm in iterative optimization, so as to find a corresponding point in the target model that can exactly match the vertex in the reference model.

Clause 10: The method according to Clause 9, an energy function $w_tE_t+w_rE_r+w_cE_c$ of model fusion composed of vertex position constraints $E_c$ before and after deformation of the reference model, constraints $E_t$ of affine transformation parameters, and regularization items $E_r$ is optimized to obtain the final optimized fusion parameters.

Clause 11: A device for efficiently compressing a dynamic 3D model sequence, comprising a non-transitory memory for storing an application program, a processor, and a computer program stored in the non-transitory memory and running on the processor, which is executed by the processor to implement: storing a 3D model of one frame of the dynamic 3D model sequence as a reference model; determining an initial correspondence between vertices of the reference model and a target model to substantially align the reference model and the target model by optimizing an energy function of the reference model so as to obtain initialized fusion parameters, wherein the target model is a 3D model of remaining frames of the dynamic 3D model sequence; and determining the final fusion parameters for deforming the reference model into the target model through an iterative optimization method.

Clause 12: The device according to Clause 11, wherein the processor further executes the computer program to: divide the vertices of the reference model into a plurality of blocks, and search for the corresponding point of the vertex of the reference model in the target model through an Iterative Closest Point (ICP) algorithm for each vertex in the block in units of blocks, so as to solve a rigid transformation of a block in the reference model transforming to the target model, wherein the rigid transformation includes a translation vector t and a rotation vector R.

Clause 13: The device according to Clause 12, wherein the processor further executes the computer program to: in the Iterative Closest Point (ICP) algorithm, search for a corresponding point of the vertex of the reference model in the target model through normal projection, the normal projection being based on the distance from a point to a line being the minimum.

Clause 14: The device according to Clause 12, the processor further executes the computer program to: determine a vertex $x^0$ representing the rigid motion of the blocks of the reference model when partitioning the blocks.

Clause 15: The device according to Clause 14, wherein the processor further executes the computer program to: calculate the position point $x_c=Rx^0+t$ of the vertex $x^0$ in the target model using the translation vector t and the rotation vector R of the rigid transformation obtained by the Iterative Closest Point (ICP) algorithm, wherein $x_c$ represents a position constraint for the vertex $x^0$ moving to the point $x_c$ after the transformation.

Clause 16: The device according to Clause 15, wherein the processor further executes the computer program to: construct a position constraint function $\|W_c(x-x_c)\|^2$ using the position constraints calculated by each block, and constructing a Laplacian energy function $\|Lx-Lx^0\|^2$, and optimizing the energy function:

$$E=\left\|Lx-Lx^0\right\|^2+\|W_c(x-x_c)\|^2$$

Wherein L is a Laplacian matrix, $W_c$ is a weight matrix of the position constraints, $x^0$ is the initial position of the vertex of the reference model, and $x_c$ is the position constraint of the vertex of the reference model, which is the corresponding vertex position of the vertex of the reference model in the target model.

Clause 17: The device according to Clause 11, wherein the processor further executes the computer program to: randomly sample a plurality of control points from the vertices of the reference model, and use weighting of an affine transformation of the control points to represent the deformation of the vertices in the reference model $$\tilde{v}_j=\sum_{i=i}^{m} w_i(v_j)t_i(v_j).$$

Clause 18: The device according to Clause 17, wherein the processor further executes the computer program to: initialize fusion parameters of the control points by model alignment.

Clause 19: The device according to Clause 18, wherein the processor further executes the computer program to: construct the position constraint $E_c$ of the vertex through the nearest neighbor compatible point search algorithm in iterative optimization, so as to find a corresponding point in the target model that can exactly match the vertex in the reference model.

Clause 20: The device according to Clause 19, wherein the processor further executes the computer program to: optimize an energy function $w_tE_t+w_rE_r+w_cE_c$ of model fusion composed of vertex position constraints $E_c$ before and after deformation of the reference model, constraints $E_t$ of affine transformation parameters, and regularization items $E_r$ to obtain the optimized fusion parameters.

Clause 21: A voxel capture system, comprising: a capturing unit that acquires a plurality of 2D images of an object in time series from multiple angles by using a calibrated camera array; a modeling unit that extracts the foreground from the plurality of 2D images, and constructs a dynamic 3D model sequence using an algorithm; a dynamic 3D model sequence compressing unit that obtains fusion parameters to compress the dynamic 3D model sequence according to the method of at least one of claims 1-10; and a restoring unit that restores the dynamic 3D model sequence according to the fusion parameters obtained from the dynamic 3D model sequence compressing unit.

Clause 22: A non-transitory machine-readable storage medium comprising instructions that, when executed by one or more processors of a machine, cause the machine to perform operations: storing a 3D model of one frame of the dynamic 3D model sequence as a reference model; determining an initial correspondence between vertices of the reference model and a target model to substantially align the reference model and the target model by optimizing an energy function of the reference model so as to obtain initialized fusion parameters, wherein the target model is a 3D model of remaining frames of the dynamic 3D model sequence; and determining the final fusion parameters for transforming the reference model into the target model through an iterative optimization method.

What is claimed is:

1. A method for efficiently compressing a dynamic 3D model sequence, comprising:

storing a 3D model of one frame of the dynamic 3D model sequence as a reference model;

determining an initial correspondence between vertices of the reference model and a target model to align the reference model and the target model by optimizing an energy function of the reference model so as to obtain initialized fusion parameters, wherein the target model is a 3D model of remaining frames of the dynamic 3D model sequence, wherein the determining the initial correspondence further comprises dividing the vertices of the reference model into a plurality of blocks, searching for the corresponding point of each vertex of the reference model in the target model through an Iterative Closest Point (ICP) algorithm for each vertex in the block in units of blocks, so as to solve a rigid transformation of a block in the reference model transforming to the target model, wherein the rigid transformation includes a translation vector t and a rotation vector R; and determining the final fusion parameters for deforming the reference model into the target model by iteratively optimizing the initialized fusion parameters.

2. The method according to claim 1, wherein in the Iterative Closest Point (ICP) algorithm, an initial corresponding point of each vertex of the reference model in the target model is searched for through normal projection, the normal projection being based on the distance from a point to a line being the minimum.

3. The method according to claim 1, wherein a vertex $x^0$ representing the rigid motion of the blocks of the reference model is determined when partitioning the blocks.

4. The method according to claim 3, wherein the position point $x_c=Rx^0+t$ of the vertex $x^0$ in the target model is calculated using the translation vector t and the rotation vector R of the rigid transformation obtained by the Iterative Closest Point (ICP) algorithm, wherein $x_c$ represents a position constraint for the vertex $x^0$ moving to the point $x_c$ after the rigid transformation.

5. The method according to claim 4, wherein a position constraint function $\|W_c(x-x_c)\|^2$ is constructed using the position constraints calculated for each block, and a Laplacian energy function $\|Lx-Lx^0\|^2$ is constructed, and the energy function is optimized:

$$E=\|Lx-Lx^0\|^2+\|W_c(x-x_c)\|^2$$

wherein L is a Laplacian matrix, $W_c$ is a weight matrix of the position constraints, $x^0$ is the initial position of the vertex of the reference model, and $x_c$ is the position constraint of the vertex of the reference model, which is the corresponding vertex position of the vertex of the reference model in the target model.

6. The method according to claim 1, wherein a plurality of control points are randomly sampled from the vertices of the reference model, and weighting of an affine transformation of the control points is used to represent the deformation of the vertices in the reference model $$\tilde{v}_j=\sum_{i=i}^{m}w_i(v_j)t_i(v_j).$$

7. The method according to claim 6, wherein the fusion parameters of the control points are initialized by model alignment.

8. The method according to claim 7, wherein in the iterative optimization, the position constraint $E_c$ of the vertex is constructed through the nearest neighbor compatible point search algorithm in iterative optimization, so as to find a corresponding point in the target model that can exactly match the vertex in the reference model.

9. The method according to claim 8, wherein an energy function $w_tE_t+w_rE_r+w_cE_c$ of model fusion composed of constraints $E_t$ of affine transformation parameters, regularization items $E_r$ and vertex position constraints $E_c$ before and after deformation of the reference model is optimized to obtain the final optimized fusion parameters.

10. A device for efficiently compressing a dynamic 3D model sequence, comprising:

a non-transitory memory; and circuitry configured to: store a 3D model of one frame of the dynamic 3D model sequence as a reference model;

determine an initial correspondence between vertices of the reference model and a target model to substantially align the reference model and the target model by optimizing an energy function of the reference model so as to obtain initialized fusion parameters, wherein the target model is a 3D model of remaining frames of the dynamic 3D model sequence, wherein determining the initial correspondence further comprises dividing the vertices of the reference model into a plurality of blocks, searching for the corresponding point of each vertex of the reference model in the target model through an Iterative Closest Point (ICP) algorithm for each vertex in the block in units of blocks, so as to solve a rigid transformation of a block in the reference model transforming to the target model, wherein the rigid transformation includes a translation vector t and a rotation vector R; and determine the final fusion parameters for deforming the reference model into the target model through an iterative optimization method.

11. The device according to claim 10, wherein the circuitry is further configured to: in the Iterative Closest Point (ICP) algorithm, search for a corresponding point of the vertex of the reference model in the target model through normal projection, the normal projection being based on the distance from a point to a line being a minimum.

12. The device according to claim 10, wherein the circuitry is further configured to: determine a vertex $x^0$ representing the rigid motion of the blocks of the reference model when partitioning the blocks.

13. The device according to claim 12, wherein the circuitry is further configured to: calculate the position point $x_c=Rx^0+t$ of the vertex $x^0$ in the target model using the translation vector t and the rotation vector R of the rigid transformation obtained by the Iterative Closest Point (ICP) algorithm, wherein $x_c$ represents a position constraint for the vertex $x^0$ moving to the point $x_c$ after the transformation.

14. The device according to claim 13, wherein the circuitry is further configured to: construct a position constraint function $\|W_c(x-x_c)\|^2$ using the position constraints calculated for each block, and constructing a Laplacian energy function $\|Lx-Lx^0\|^2$, and optimizing the energy function:

$$E=\|Lx-Lx^0\|^2+\|W_c(x-x_c)\|^2$$

wherein L is a Laplacian matrix, $W_c$ is a weight matrix of the position constraints, $x^0$ is the initial position of the vertex of the reference model, and $x_c$ is the position constraint of the vertex of the reference model, which is the corresponding vertex position of the vertex of the reference model in the target model.

15. The device according to claim 10, wherein the circuitry is further configured to; randomly sample a plurality of control points from the vertices of the reference model, and use weighting of an affine transformation of the control points to represent the deformation of the vertices in the reference model $$\tilde{v}_j = \sum_{i=i}^{m} w_i(v_j)t_i(v_j).$$

16. The device according to claim 15, wherein the circuitry is further configured to: initialize fusion parameters of the control points by model alignment.

17. The device according to claim 16, wherein the circuitry is further configured to: construct the position constraint $E_c$ of the vertex through the nearest neighbor compatible point search algorithm in iterative optimization, and find a corresponding point in the target model that can exactly match the vertex in the reference model.

18. A non-transitory machine-readable storage medium comprising instructions that, when executed by one or more processors of a machine, cause the machine to perform operations:

storing a 3D model of one frame of the dynamic 3D model sequence as a reference model;

determining an initial correspondence between vertices of the reference model and a target model to substantially align the reference model and the target model by optimizing an energy function of the reference model so as to obtain initialized fusion parameters, wherein the target model is a 3D model of remaining frames of the dynamic 3D model sequence; and determining the final fusion parameters for transforming the reference model into the target model through an iterative optimization method, wherein a plurality of control points are randomly sampled from the vertices of the reference model, and weighting of an affine transformation of the control points is used to represent the deformation of the vertices in the reference model $$\tilde{v}_j = \sum_{i=i}^{m} w_i(v_j)t_i(v_j).$$

* * * * *